UNITED STATES PATENT OFFICE.

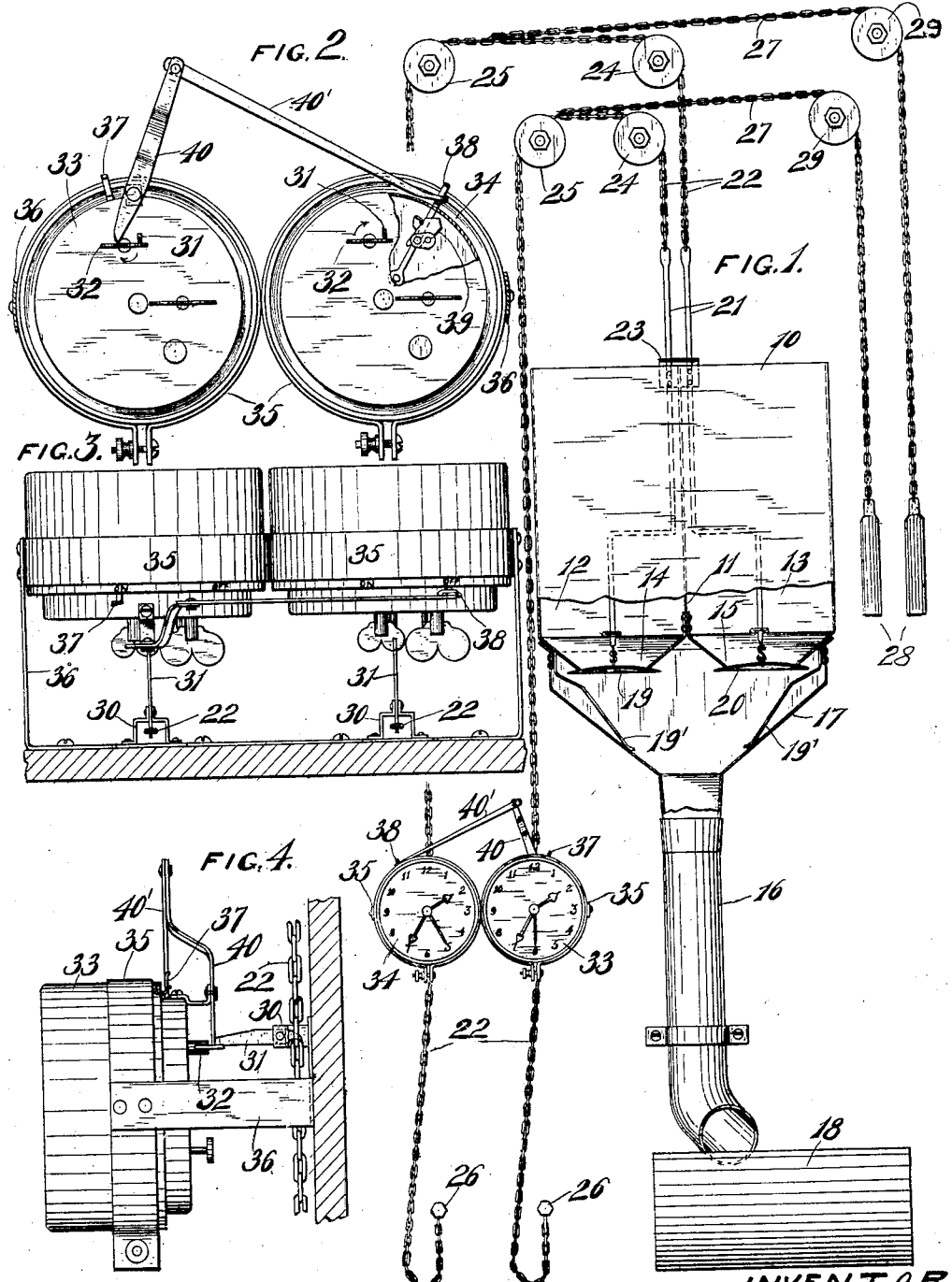

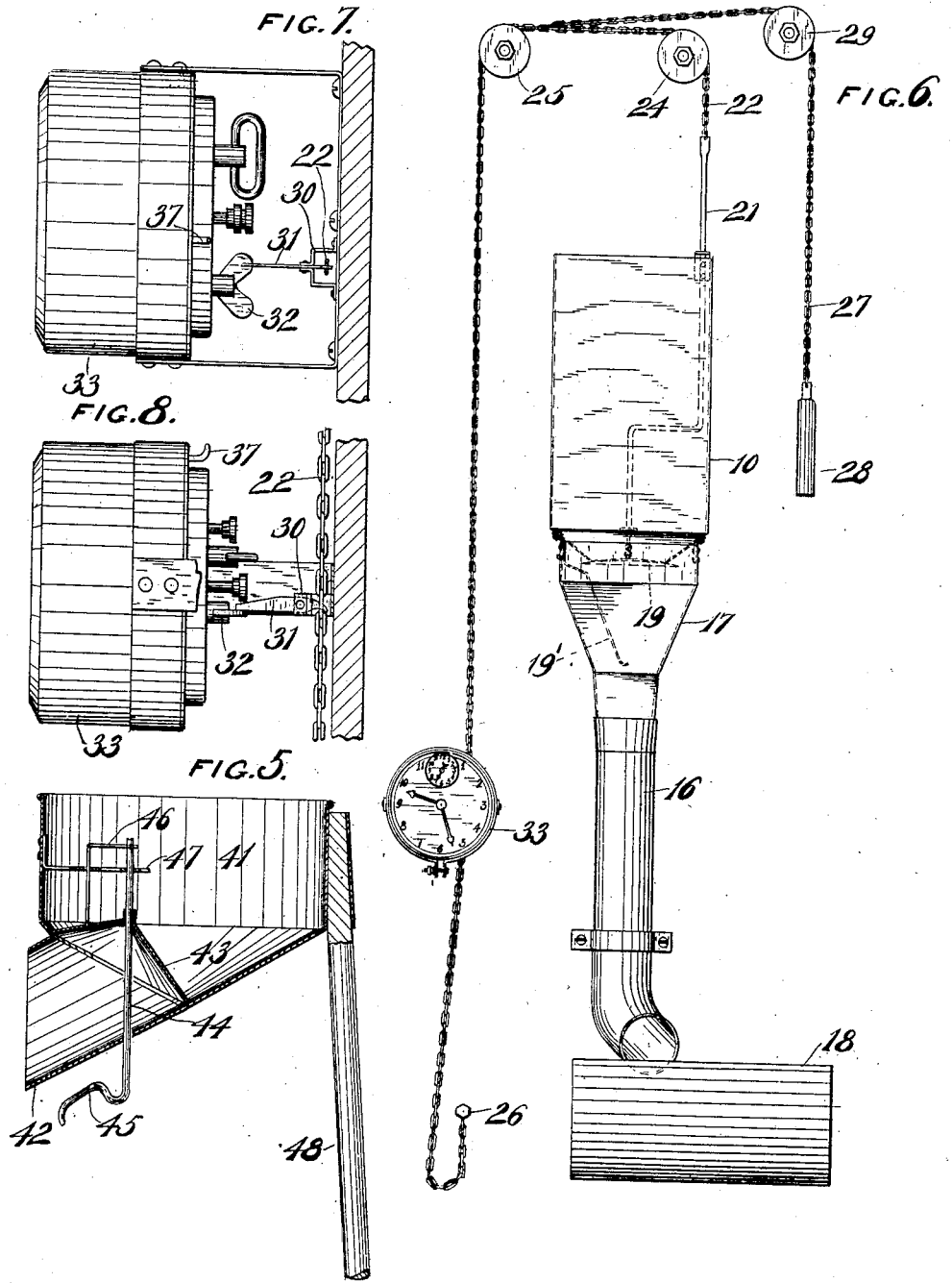

CHARLES CASPARI, OF MILWAUKEE, WISCONSIN.

AUTOMATIC ANIMAL-FEEDER.

963,866.  Specification of Letters Patent.  Patented July 12, 1910.

Application filed November 3, 1909. Serial No. 525,998.

*To all whom it may concern:*

Be it known that I, CHARLES CASPARI, residing in Milwaukee, in the county of Milwaukee and State of Wisconsin, have invented new and useful Improvements in Automatic Animal-Feeders, of which the following is a description, reference being had to the accompanying drawings, which are a part of this specification.

This invention relates to improvements in automatic animal feeding devices adapted to be operated at predetermined periods of time whereby animals may be fed at different times without the necessity of personal attendance.

The feeder is particularly adapted for use in feeding oats to horses and is so constructed that the operator can fill the receptacles with oats and set the clocks to discharge the oats from one of the receptacles at a predetermined time in the evening and to discharge the oats from the other receptacle at a predetermined time the next morning.

One of the objects of this invention is to provide an animal feeder which is adapted to operate a plurality of times with one setting of the mechanism.

With the above, and other objects in view, the invention consists of the animal feeder and its parts and combinations and all equivalents thereof.

Referring to the accompanying drawings in which the same reference characters indicate the same parts in all of the views; Figure 1 is a front view of the complete feeder, parts broken away and other parts in section to show interior construction; Fig. 2 is a rear view of the clocks, used in controlling the feeder, and connections; Fig. 3 is a plan view of the clocks shown in Fig. 2 and the releasing levers; Fig. 4 is a side view thereof; Fig. 5 is a central vertical sectional view of the receptacle for charging the feeders; Fig. 6 is a front view of a modified form of feeder; Fig. 7 is a plan view of the clock and releasing lever for operating the modified form of feeder; and Fig. 8 is a plan view thereof.

In the drawings the numeral 10 indicates a hopper provided with a central partition 11 which divides the hopper into two compartments 12 and 13 having discharge openings 14 and 15 formed in the bottom thereof. A discharge pipe 16 provided with an enlarged upper end 17 covering discharge ends of both compartments is positioned below the hopper and is adapted to guide the material discharged from either compartment into a feed trough 18. The discharge of material from the hopper discharge openings is controlled by means of valves 19 and 20 suspended from valve rods 21 and valve chains 22. The rods are guided by passing through openings in a guide bracket 23 connected to the upper portion of the hopper. The valve chains 22 extend upwardly from the rods 21 and pass over pulleys 24 and 25 and depend from the pulleys 25 and are fastened to stop bolts 26. Opening chains 27 provided with weights 28 on their lower ends and passing over pulleys 29 are connected to the valve chains at points close to the pulleys 25 when the valves are in a closed position. Valve tipping members 19′ are positioned within the enlarged portion of the discharge pipe and are adapted to tilt the valves when dropped to open position in order to provide a clear passageway for the material. The depending portions of the chains 22 pass through openings in brackets 30 and are adapted to be engaged by the short arms of releasing levers 31 pivotally connected to said brackets. The short arms of these releasing levers are shaped to be inserted in the chain links and to hold said chains taut, when the valves are covering the discharge openings of the hopper. The long arms of the releasing levers project forwardly from the brackets and are positioned in the path of movement of the alarm winding keys 32 of alarm clocks 33 and 34 or of automatic time releasing means of any desirable construction whereby at predetermined periods of time they may be released to permit the weights to lift the chains and open the valves. The clocks 33 and 34 are held in clamping rings 35 forming parts of a supporting bracket 36 which is adapted to be fastened to the side wall of a building in which the device is installed. The clocks are provided with stop arms 37 and 38 adapted to be moved into the circumferential paths of movement of the rotary alarm bell hammers 39 to prevent the operation of the alarm mechanism. A stop arm moving lever 40 pivoted to the clock 33 and having one arm in the path of movement of the alarm winding key of this clock is provided with a link 40′ pivotally connected to its upper end and the opposite end of the link is connected to the stop arm 38 of the clock 34 so that when the alarm of the clock 33 rings, its winding key will move the stop arm levers and link. The stop arm 38 which is normally set in the "off" position will be moved by the link into the "on" position and the alarm winding key will be permitted to turn, and the releasing lever to disengage the chain when the hands of the clock reach the time to which it has been set to ring the alarm.

For convenience in charging the hopper with feed a charging device is provided which consists of a receptacle 41 having an angularly positioned discharge spout 42 provided with a gravity closing valve 43. A valve opening rod 44 rigidly connected to the valve and extending through the lower portion of the spout is provided with a bent portion 45 adapted to be hooked over the top edge of the hopper to open the valve and discharge the contents thereof into said hopper. A guide rod 46 is connected to the valve and extends through an opening in a bracket 47. The charging device is elevated to the hopper by means of the long handle 48 forming part of the device.

The modified form shown in Figs. 6, 7 and 8 is similar in every respect to the principal form with the exception that the hopper has only one compartment and only one clock is necessary to release its valve.

The operation of the feeder is as follows: The clocks are wound and the alarm mechanism set and the valve chains which are drawn taut to close the valves, are engaged by the releasing levers and the long arms of these levers are positioned on top of the winding keys of the alarms. The charging device is now filled with material and raised to the hopper and when the bent portion of the valve rod is hooked over the edge of the hopper wall and the handle pulled downwardly the receptacle will be moved away from the valve and discharge its contents into one of the compartments. The same operation is repeated to fill the other compartments. The alarm mechanism of the clock 33 must be set to ring first to open the valve of the compartment 12 and the movement of the winding key of this mechanism will turn the stop arm moving lever and move the stop arm of the clock 34 to the "on" position so that when the clock hands indicate the time to which this alarm has been set its alarm mechanism will operate and open the valve of the compartment 13. It is of course obvious that both clocks cannot be set to open the valves at the same hour of the night and the morning, as this would cause both clocks to release the valves at the same hour the first clock was set to operate at. Also the first clock must not be set to operate at an hour in the evening previous to the hour which it is desired to operate the feeder the next morning, as this arrangement would cause both clocks to release the valves the same evening. When the hands of the clock 33 have reached the time indicated by its alarm mechanism its winding key will be turned and will release the valve chain associated therewith and the weight connected thereto will lift the chain and allow the valve 19 to drop by gravity and discharge the contents of the compartment 12 into the tube and to the trough below. Simultaneously with this movement just described the stop arm moving lever will be turned by the same winding key and the alarm mechanism of the clock 34 set to the "on" position so that it will operate in the same manner as the first clock when the predetermined time is reached by its hands.

The weights serve to lift the valve chains and relieve the valves of this weight and permit the valves to open by gravity.

The modified form of feeder operates in a manner similar to the clock first operated.

From the foregoing description it will be seen that the device is very simple in operation and construction and is inexpensive to maintain.

What I claim as my invention is:

1. An automatic animal feeder, comprising a plurality of receptacles provided with discharge openings, valves covering said openings, a plurality of automatic time releasing means provided with revoluble members, a connection between the releasing means for preventing the operation of one of the releasing means until after the operation of the other releasing means, releasing members positioned to be locked by the revoluble members, and connections between the valves and the releasing members to permit the valves to drop from their seats in successive order when the releasing members are actuated by the revoluble members.

2. An automatic animal feeder, comprising a plurality of receptacles provided with discharge openings, valves covering said openings, a plurality of automatic time releasing means provided with revoluble members and with stop arms, means connecting the revoluble member of one time releasing means with the stop arm of another time releasing means to cause their operation in successive order, releasing members positioned to be locked by the revoluble members, and flexible connections between the valves and the releasing members to permit the valves to drop from their seats in successive order when the releasing members are actuated by the revoluble members.

3. An automatic animal feeder, comprising a hopper provided with compartments and with discharge openings, valves covering said openings, flexible connections supporting said valves in closed positions and passing over pulleys, alarm clocks provided with alarm winding keys and with stop arms, levers positioned to engage the flexible connections and the winding keys, and a connection between the winding key of one clock and the stop arm of another clock to release the alarm mechanism of the latter clock so it may operate at a predetermined period of time after the operation of the former clock and release the valve actuated thereby.

4. An automatic animal feeder, comprising a hopper provided with compartments and with discharge openings, valves covering said openings, flexible connections supporting said valves in closed positions and passing over pulleys, a pair of alarm clocks provided with alarm winding keys and one of said clocks provided with a stop arm, levers positioned to engage the flexible connections and the winding keys, a stop arm lever positioned to be engaged by one of the winding keys and having a connection with the stop arm to move said arm to release the alarm mechanism so it may operate at a predetermined period of time after said movement.

5. An automatic animal feeder, comprising a hopper provided with two compartments and each one having a discharge opening, valves covering said openings, guide rods connected to said valves and depending from supporting chains which pass over pulleys, a pair of alarm clocks provided with alarm winding keys and one of said clocks provided with a stop arm, levers positioned to be inserted in the links of the chains and the opposite ends thereof in engagement with the winding keys, a stop arm lever positioned to be engaged by one of the winding keys and having a linked connection with the stop arm to move said arm to release the alarm mechanism so it may operate at a predetermined period of time after said movement.

In testimony whereof, I affix my signature, in presence of two witnesses.

CHARLES CASPARI.

Witnesses:
C. H. KEENEY,
ALMA A. KLUG.